June 15, 1965 M. H. EASY ETAL 3,189,898
PLOTTING DEVICES FOR USE WITH RADAR APPARATUS
Filed Sept. 22, 1961 2 Sheets-Sheet 1

United States Patent Office 3,189,898
Patented June 15, 1965

3,189,898
PLOTTING DEVICES FOR USE WITH
RADAR APPARATUS
Maurice Henry Easy, John Harold Turner Fairhurst, Charles Freeman Robinson, and Thorleif Oscar Vendel Palmqvist, all of London, England, assignors to Decca Limited, a British company
Filed Sept. 22, 1961, Ser. No. 144,809
Claims priority, application Great Britain, Sept. 22, 1960, 32,634/60
6 Claims. (Cl. 343—11)

This invention relates to plotting devices for use with radar apparatus on mobile craft, and is directed more particularly to facilitating the determination of safe manoeuvres for avoiding collisions. The device may be used with a plan position display on which radar information is directly displayed or with a display, for example a radar plotter, onto which radar information is transferred automatically or semi-automatically.

According to this invention a plotting device for use with a plan position display of radar information on a display screen on a mobile craft comprises a transparent plotting member carried on a parallel motion linkage for movement over the surface of the display screen. With this construction, the direction and distance corresponding to the reciprocal of the motion of the radar carrying craft in a given period can be set vectorially against a previously plotted position of another craft. Assuming the given period is the time, up to the present, from making the plot of the target, the point thus determined, in conjunction with the present position of the target on the display gives the true motion of the target as distinct from the motion relative to the radar carrying craft. This is because a plan position display of radar information on a mobile craft, whether it is a direct display of the radar information or whether it is a display of specific information transferred from the radar apparatus to a display screen, shows the relative position of other craft with respect to the radar carrying craft. The gradual motion of the information across the display screen corresponds to the relative motion of the other craft with respect to the radar carrying craft. If, when a distant target is observed, its position is marked on the display screen, and if, after an interval of time, the reciprocal of the motion of the radar carrying craft is vectorially set against this plotted position, the end of this vector and the new position of the distant target are points defining a line representing the true motion of the distant craft during this period. If this true motion is then combined with a vector representing the possible future motion of the radar carrying craft in a time period of the same duration, assuming the radar carrying craft changes its course, then the line between the end of this further vector and the position representing the present position of the distant target will indicate the relative motion of the two craft on the assumption that the radar carrying craft has changed its course. It will be seen, therefore, that to determine the future relative motion of the two craft in the event of a given change of course of the radar carrying craft, it is necessary firstly to set the reciprocal motion of the radar carrying craft as a vector from the initial position of the distant target so defining a new point at the end of this vector and then from this new point to set a vector representing the motion of the radar carrying craft on a proposed new course. In the very simplest form, the aforementioned transparent plotting member may comprise a transparent member with a range and bearing graticule which member is set so that the centre of the graticule is offset from the initial position of the target craft in a direction corresponding to the reciprocal of the motion of the radar carrying craft and by an amount corresponding to the movement of the radar carrying craft in the time interval since this initial plot. By mentally drawing an arc around the graticule from the initial position of the distant target, which is readily done with a graticule having range circles, the effect on the relative track of the two craft of various changes in course may readily be considered and it can easily be determined what change of course may be desirable to avoid any risk of collision.

Preferably, however, to avoid having mentally to rotate a vector, means are provided for transferring the position represented by the end of the vector lying on the initial plot of the distant target through an arc. This avoids the necessity of mentally following around an arc on a graticule. In one convenient form of construction the transparent plotting member comprises a first arm pivotally mounted on a member movable without rotation, so that the arm can be set in a direction to represent the reciprocal of the motion of the radar carrying craft, which first arm carries a second arm pivotally mounted on the first arm for rotation about one end of the vector represented by the first arm, thereby enabling the relative course of the two craft for any given change of course of the radar carrying craft to be determined. This apparatus is used as follows: The positions of distant craft are plotted on the display or on a fixed plotting board and the time noted. After a suitable elapsed time, the amount of movement of the radar carrying craft is determined and plotted, to the appropriate display scale, along the two arms from the pivot point. The first arm is then rotated or set in accordance with the heading of the radar carrying craft and the plot on this arm is put over the initial position of any of the distant craft. The second arm may then be rotated and the plot on this arm used in conjunction with the present position of the selected craft employed to visualise the closest approach distance. This distance is the shortest distance from the position on the display of the radar carrying craft to the straight line drawn betwen the plot on the second arm and the present position of the selected craft. When the optimum new course has been selected, the same procedure may be followed with any other craft presenting a possible collision risk to find the nearest approach distance with the selected course. The angular displacement between the two arms when the selected course has been found represents the required change in course and a suitable scale may be provided on one of the arms co-operating with a mark on the other for enabling this change in course to be measured. It may be convenient to have a compass rose about the pivot axis facilitating setting of the first arm. On this rose the required new course may be read directly from the position of the second arm and it may be convenient to make the lower arm as a transparent member with a range and bearing graticule.

According to another aspect of the invention a plotting device for use with a plan position display of radar information on a display screen comprises a transparent plotting member capable of movement over the surface of display, the member being mounted so that a marker thereon may be moved around an arcuate path on the display screen, the arcuate path being a circular arc of a selected adjustable radius about a centre at any selected point on the display screen, and means for indicating the angular extent of the arc.

In one arrangement, a plotting device for use with a plan position display of radar information on a display screen comprises a transparent plotting member capable of movement freely over the surface of the display screen, the member being mounted so as to be freely movable over the display screen without rotation and also arranged so that any point marked thereon may be moved around an arcuate path over the display screen, the arcuate path being a circular arc of a selected adjustable radius. As before, indicating means may be provided for indicating the angular extent of the arcuate movement. The movement around an arcuate path may be effected while still maintaining the member against rotation by providing guide means for constraining one point of the member to move around a circular arc of adjustable radius. Since the member is constrained against rotation, every point on it will move around the same arc. For example, the member may be mounted on a parallel movement linkage and one point of the member may carry a first pivot on which is mounted an arm engaging a second pivot on a fixed point of the display screen structure so that the member may be moved through an arc having a radius equal to the distance between the two pivots. Such movement may be effected without rotation of the member and this enables any point marked thereon to be moved through a circular arc. One of the pivots may be made adjustable in position on said arm to vary the radius. Very conveniently, the member engages a pivot on the arm for relative rotational movement only and the arm has a slot engaging the pivot on the fixed part of the display apparatus to enable the radius to be adjusted. Locking means may be provided to secure said second pivot at any required point along the slot. The arm may carry a scale co-operating with a pointer on the second pivot to provide a calibrated indication of the radius of the arc. A bearing scale may be provided on the transparent member to co-operate with a mark on said arm for indicating the arcuate direction of the arm thus enabling the extent of arcuate movement to be measured. Conveniently the transparent member in this arrangement comprises a transparent sheet covering the whole, or substantially the whole, of the display. This device is used by firstly plotting on the transparent sheet the initial position of all distant craft which are of interest. The centre of the display is also marked and the time noted. After a suitable time interval to allow a reasonable plotting scale, the distance the radar carrying craft has moved is computed and the computed distance is set to determine the radius of movement of the transparent member. The latter is then moved around an arc and the new position of the original plot on any distant craft in conjunction with the present position of that craft indicated on the display, represents the relative motion of that craft compared with the radar carrying craft, assuming the radar carrying craft has changed its course by an amount corresponding to the arcuate movement. It may readily be seen how such changes of course affect the nearest approach distance. With this arrangement any number of distant craft may be initially plotted and the nearest approach distance of all the craft may readily be assessed for any given position of the transparent plotting member. After having decided to change course, lines may be drawn to show the near relative tracks; this facilitates observation subsequently to see if the other craft maintain their courses unaltered.

If, in the last described construction, the user is prepared to forego the freedom of choice of the elapsed time interval between the plots, the construction of the device may be greatly simplified by providing for rotation only on a single fixed radius.

In the following description reference will be made to the accompanying drawings, in which.

Figure 1:
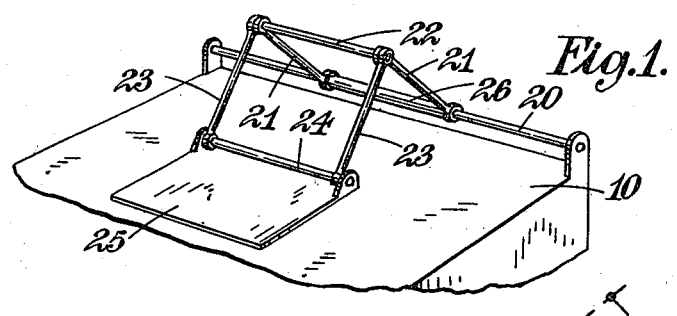
FIGURE 1 is a perspective view of one embodiment of the invention.

Referring to FIGURE 1, there is shown a radar plan position display screen 10. This display screen might be a cathode ray tube fed directly with signals from a radar receiver to provide a plan position display, or it might be a plotting device, e.g. a remote printing plotting device, onto which radar information is transferred automatically or semi-automatically so as to display information concerning the position of distant targets in the form of a plan position display. The apparatus is for use on a mobile craft such as, for example, a ship, and the plan position display will therefore inherently provide information representing the relative positions of distant targets with respect to the radar carrying craft.

Extending along the back edge of the display device housing is a guide rod 20 on which are pivotally and slidably carried two tubular links 21, one end of each link being secured to a tubular spacer 26 forming a pivot rotatable on and slidable along the rod 20. The ends of these links remote from the guide rod 20 are pivoted on a concentric tubular pivot 22 which serves also as a spacing device to hold the links 21 at fixed distances apart. This concentric tubular pivot carries a rigid tubular frame comprising two further links 23 joined by a cross member 24. Pivotally carried on this frame for relative pivotal movement about the axis of the cross member 24 is a transparent plotting member 25 conveniently formed of a sheet of transparent plastic material. The links 21 with their spacers form a first rigid frame which is conveniently of square or rectangular form. The links 23 with their spacers form a second rigid frame which is also conveniently square or rectangular. Cross members (not shown) may be provided on these frames to give additional rigidity. As will be seen from FIGURE 1 all the pivot axes are parallel to the axis of the guide rod 20 which is parallel to the plane of the display screen 10. The plotting member 25 may thus lie flat on top of the display screen 10 and is movable over the surface of the display screen. The links 21, 23, however, with their connecting pivots form a parallel motion linkage preventing rotation of the transparent plotting member 25. In the particular embodiment shown the guide rod 20 and links 21 are positioned so that, when the plotting member 25 is not in use, it may be swung right over to hang down behind the back of the housing of the display apparatus.

Figure 2:
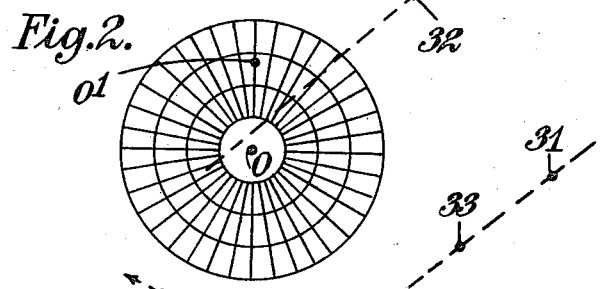
FIGURES 2, 3 and 4 are diagrams illustrating the method of use of the apparatus of FIGURE 1.
Figure 3:
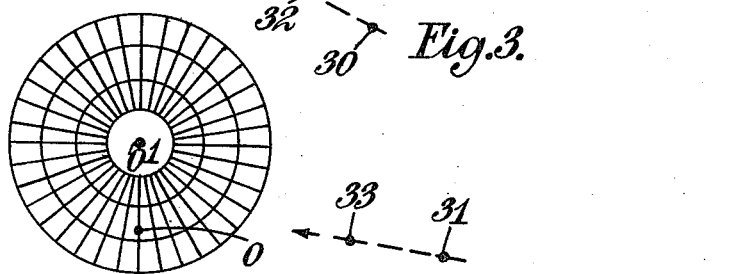
Figure 4:
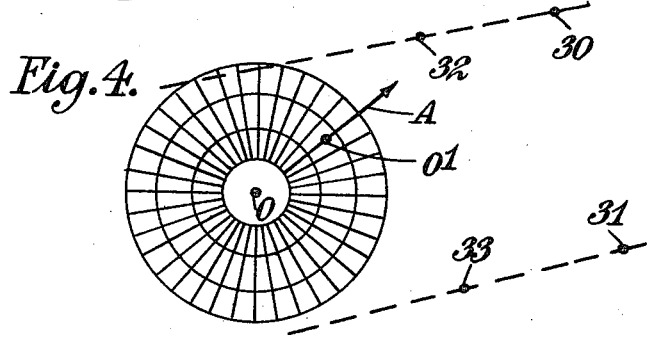

On the plotting member 25 there may conveniently be engraved a range and bearing graticule in the form of radial lines and concentric circles but for clarity of the drawing, such a graticule is not shown in FIGURE 1. In the following description of the manner of use of the apparatus, reference will be made to FIGURES 2, 3 and 4. In these figures a range and bearing graticule is illustrated to indicate the position of the radar display which is a plan position display centered on the center of this graticule. The plotting device described above would most conveniently be used with a compass stabilised radar display in which the position of the radar carrying craft remains at a fixed point on the display screen, usually the centre of the display screen, and in which any direction across the display screen corresponds always to the same compassed direction. Such a display is often called a "North-upwards" display as it is usual to make the direction across the display screen away from the observer (if a horizontal screen is used) correspond to North. The apparatus may, however, as will be apparent from the following description, be employed with an unstabilised display, that is to say a "ships-head up" display in which the heading of the radar-carrying craft is a fixed direction on the display screen. In operation the plotting member 25 is placed in position with the centre marked at 0 in FIGURE 2 over the position corresponding to the position of the radar carrying craft on the display screen and plots such as the marks 30, 31 are made on the plotting member 25 of those distant ships whose tracks have to be considered. It will be understood that, since the plotting device is for the primary purpose of determining safe manoeuvres to avoid any risk of collision it will only be necessary to make plots of those ships which might possibly present a collision risk. The plots on the distant ships are preferably marked as quickly as possible so that it can be assumed they represent the positions of these craft at the same datum time. At some later time these ships have moved to the positions 32 and 33, as shown in FIGURE 2. In this figure it is assumed that the display is of the type in which the radar carrying craft's position remains a fixed point on the display screen, that is to say, at the point 0. The lines joining 30, 32 and 31, 33 thus indicate the relative tracks of the two distant craft with respect to the radar-carrying craft and the distance of these lines from the centre 0 is a direct indication of the nearest approach distance. In FIGURE 2 it will be seen that the ship originally plotted at 30 would approach quite close to the radar-carrying craft and it would appear therefore that some manoeuvre is desirable in order to avoid such closeness of approach. In general it will be desirable to maintain the speed constant but to steer a new course to increase the clearance distance. The sailing regulations will generally indicate the required direction of turn, but the amount of turn must be discovered. From the known time elapsing between the original plots 30, 31 and from the known speed of the radar-carrying craft, the distance the latter has travelled may be determined, and this distance is plotted forwardly in the direction of the ship's heading to give the point 0', which point is marked on the plotting member 25 and is shown in FIGURE 2. In this example, the direction corresponding to the ship's heading is assumed to be vertically upwards on the paper, i.e. due North for a North-upwards compass stabilised display. This is merely by way of example and the direction corresponding to the heading could be in any other direction on the drawing. The plotting member 25 is then moved so that the point 0' coincides with the present position of the radar-carrying craft on the display screen. This condition is shown in FIGURE 3. As a result of this the original plots 30, 31 have been moved with respect to the radar display and these plots, as marked on the plotting member 25, in conjunction wtih the present positions of the distant targets 32, 33 (which positions are visible through the transparent plotting member 25) indicate the true courses and true speeds of these two distant craft. Having obtained the true course and speed of such distant craft, it is now possible to investigate the effect of a change of course. For convenience in explaining the manner of use of this device it is convenient at this stage to consider that the transparent plotting member 25 is lifted off the display screen and that a new course for the radar-carrying craft is marked out on the display screen for a distance representing the distance travelled in the originally measured elapsed time. The point 0' on the plotting member 25 is now moved into position over the display screen at this new point, as shown in FIGURE 4. Having done this, the original plots 30, 31 of the distant ships as marked on the member 25 have moved to new positions relative to the radar information now displayed on the display screen 10. In particular the plots 30, 31 have moved with respect to the present indicated positions 32, 33. The line joining mark 30 to the present position 32 and the line joining mark 31 to the present position 33 now represent the relative tracks of these two craft if the radar-carrying craft were now travelling on the new course represented by the arrow A in FIGURE 4. It will be seen that this change of course has increased the clearance distance for the craft which is now at 32. As indicated above, in general only a change of course is made, and not a change of speed, and hence the movement of the point 0' from the position shown in FIGURE 2 to the position shown in FIGURE 4 is movement around an arc of a circle, the arc having a radius equal to 0-0' and the angular extent of the arc being equal to the angular change of course. It will be seen that it is not necessary to go through the intermediate step of moving the point 0' onto the centre, as shown in FIGURE 3 before moving the plotting member to the position shown in FIGURE 4 and that, having marked the plots 30—31 and measured the elapsed time, to arrive at the condition illustrated in FIGURE 4, it is merely necessary to move the plotting member 25 from the position shown in FIGURE 2 through a circular arc to the position shown in FIGURE 4. As the plotting member 25 is moved, the effect on the relative courses of distant craft can be observed and it can usually be readily possible to see when the optimum change of course has been reached to give suitable clearance distances from all the distant vessels under consideration. The angular difference between the existing heading of the radar-carrying craft and the bearing at which the point 0' appears in FIGURE 4 is the alteration of course required.

Figure 5:
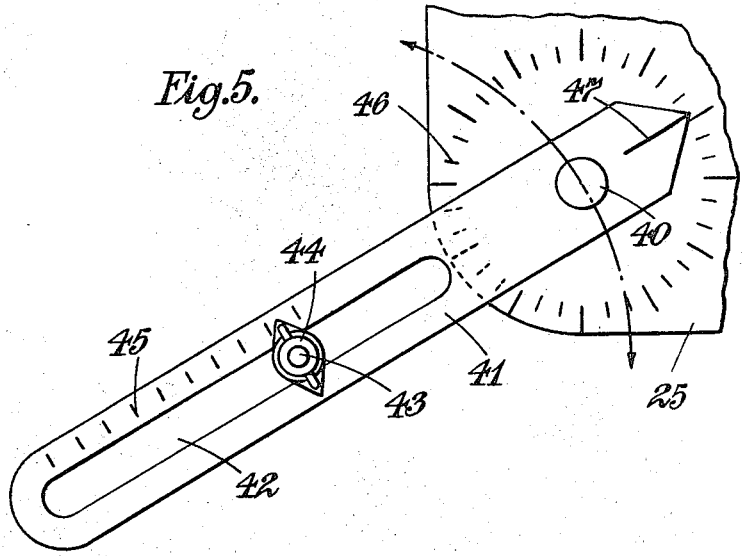
FIGURE 5 is a diagram illustrating a modification of the construction of FIGURE 1.

The transparent plotting member 25 could be moved through a circular arc manually. It may be more convenient, however, to provide means for facilitating this movement semi-automatically, and such a device is illustrated diagrammatically in FIGURE 5. In this figure, part of one corner of the plotting member 25 is illustrated. This plotting member is mounted on a parallel motion linkage (not shown) as in the arrangement of FIGURE 1. In the construction of FIGURE 5, pivotally mounted on the plotting member by means of a pivot 40 is an arm 41. This arm has a slot 42 through which extends a pivot 43 carried on a fixed part of the display screen structure. Preferably a locking device, indicated diagrammatically by a nut 44, is provided for locking this pivot 43 to clamp the pivot pin on the arm 41 against sliding movement along the slot 42 whilst still permitting rotational movement. As previously explained, the plotting member 25, in moving from the position of FIGURE 2 to that of FIGURE 4, has to move through a circular arc of radius 0-0' and of an angular extent equal to the change of course. The required movement is thus known to the user as the radius and angular extent of this arc. The arm 41 facilitates this arcuate movement of the plotting member by use in the following manner: The arm 41 is set in the direction of the ship's heading with the pivot 43 positioned in the slot 42 so that the distance between the pivots 40 and 43 corresponds to the required radius of arcuate movement of the plotting member. This is the distance 0-0' of FIGURES 2 to 4 and, to facilitate this setting, there may be provided a scale 45 on the arm 41. Having set these distances, the locking nut 44 is tightened to clamp the arm 41 and thus the member 25 is then constrained for arcuate movement about the pivot 43 with the radius of the arc determined by the spacing of pivots 40 and 43. The angular direction of the arm 41 may be read from a bearing scale 46 on the plotting member 25, this scale being centered on the pivot 40 and co-operating with an index mark 47 on the end of the arm 41. In the case of a "North-upwards" display, this bearing scale may be a compass rose which facilitates the initial setting of the arm to the direction of the ship's heading and enables the new course to be read directly from the position of the index 47 on the scale 46 after the appropriate arcuate movement of the member 25 has been effected. Obviously, if the user is prepared always to have a fixed time interval between taking the initial plots and making the movement of the plotting member, then the construction could be simplified still further by having an arm 41 of fixed length between the pivot points.

Figure 6:
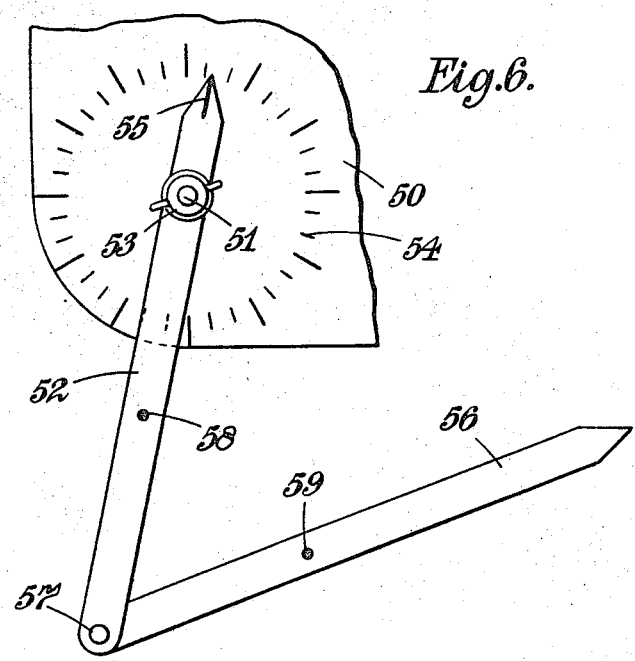
FIGURE 6 is a diagram illustrating another embodiment of the invention.

FIGURE 6 illustrates another embodiment of the invention. In this figure the reference 50 indicates part of a member which is constrained to be movable without rotation over the surface of the plotting screen (not shown), for example, by means of a linkage such as is illustrated in FIGURE 1. Pivotally mounted on this member by means of a pivot 51 is an arm 52 and the pivot is provided with locking means 53 for locking the arm 52 in any selected angular position. Conveniently for this purpose the member 50 is provided with an arcuate scale 54 co-operating with an index mark 55 on the arm 50. The arm 52 carries a second arm 56 which is angularly adjustable about a pivot point 57. The apparatus of FIGURE 6 is used in the following manner. The positions of the distant ships are initially plotted on the surface 10 of the display screen. After a suitable elapsed time, the amount of movement of the radar-carrying craft is determined and is plotted at corresponding distances (to the appropriate scale corresponding to the scale of the display) on the arms 52 and 56 as distances away from the common pivot 57. These plots are indicated at 58 and 59 respectively. The arms 52 and 56 are formed of transparent material; the arm 52 is set in the direction of the heading of the radar-carrying craft and locked by the locking means 53. By means of the parallel motion linkage, the plot on the arm 52 is placed over the first plot of any of the other ships under observation, for example the plot 30 of FIGURE 2. The arm 56 is then rotated about the pivot 57 and it will be seen that the movement of the mark 59 will correspond to the movement of the mark 30 between the positions shown in FIGURES 2 and 4. By considering the plot 59 and the present position of the appropriate distant craft, the relative course of that target and hence the clearance distance will be apparent. It will be seen that the device of FIGURE 6 in effect subtracts vectorially, from the relative motion, the actual motion of the radar-carrying craft and then adds vectorially the proposed new motion. It thereby gives the relative motion with the proposed change of course. The arrangement of FIGURE 6 provides a particularly simple construction which, however, can only be used for considering the conditions with respect to one distant ship at a time. The angular direction of the arm 56 when the optimum position has been reached indicates the required new course for a radar-carrying craft. Instead of using an arm 56, it might be in some cases more convenient to employ a fixed member, e.g. a disc, with a range and bearing graticule so that the possible positions of a point corresponding to the mark 59 on arm 56 may be visualised by following an arcuate line around the graticule from the mark 58.

We claim:
1. A plotting device comprising a display screen on which plan position radar information is displayed in combination with a transparent plotting member mounted on a parallel motion linkage for movement freely without rotation over the surface of the display screen, pivot means being provided enabling the plotting member to be swung away from the display screen when not required.

2. A plotting device comprising a display screen on which plan position radar information is displayed, a transparent plotting member, a parallel motion linkage carrying said transparent plotting member for movement without rotation over the surface of said display screen and pivot means mounting said parallel motion linkage on said display screen for pivotal movement about an axis parallel to the plane of the display screen adjacent an edge thereof.

3. A plotting device comprising a display screen on which plan position radar information is displayed, a transparent plotting member and a parallel motion linkage, which parallel motion linkage comprises a straight guide rod fixed with respect to the display screen and extending parallel to the plane of the screen adjacent an edge thereof, a first pair of links each with one end slidable along said guide rod and angularly movable about the axis of the rod, a second pair of links pivotally carried respectively on the other ends of the links of the first pair for movement about an axis parallel to that of the guide rod, and pivot means carrying said transparent plotting member on the links of said second pair to permit of angular movement about an axis parallel to that of the guide rod.

4. A plotting device as claimed in claim 3 wherein there is provided a spacer arranged between the pivots connecting the links of the first and second pairs of links.

5. A plotting device comprising a display screen on which plan position radar information is displayed, a transparent plotting member, a parallel motion linkage constraining said plotting member for movement without rotation over the surface of said display screen, guide means further constraining said plotting member for movement around an arcuate path over the display screen, the arcuate path being a circular arc of a selected adjustable radius about a center at any selected point on the display screen, and means for indicating the angular extent and radius of said arcuate path.

6. A plotting device as claimed in claim 5 wherein said guide means comprise an arm, mounted on a first pivot carried by said plotting member, and a second pivot on a fixed point on said display screen engaging said arm, one of the pivots being adjustable in position on said arm.

References Cited by the Examiner

UNITED STATES PATENTS

| 1,984,390 | 12/34 | Wright | 33—79 |
| 2,586,743 | 2/52 | Thresher et al. | 343—5 |
| 2,671,965 | 3/54 | Pollitt | 33—79 |
| 2,894,259 | 7/59 | Korn et al. | 343—11 |

FOREIGN PATENTS

| 63,190 | 8/92 | Germany. |
| 877,413 | 9/61 | Great Britain. |

CHESTER L. JUSTUS, *Primary Examiner.*